United States Patent
Fosmark et al.

[19]

[11] Patent Number: 6,084,881

[45] Date of Patent: Jul. 4, 2000

[54] MULTIPLE MODE XDSL INTERFACE

[75] Inventors: Klaus S. Fosmark, Plano; Kevin S. Dibble; William A. Perry, Jr., both of Carrollton, all of Tex.

[73] Assignee: Efficient Networks, Inc., Dallas, Tex.

[21] Appl. No.: 08/861,673

[22] Filed: May 22, 1997

[51] Int. Cl.[7] .............................................. H04L 12/28
[52] U.S. Cl. .................................... 370/397; 370/466
[58] Field of Search ..................... 370/257, 353, 370/395, 397, 419, 440, 485, 465, 466, 467, 360, 469, 420

[56] References Cited

U.S. PATENT DOCUMENTS

| | | | |
|---|---|---|---|
| 5,231,631 | 7/1993 | Buhrke et al. ............................. | 370/60 |
| 5,274,768 | 12/1993 | Traw et al. ............................... | 395/275 |
| 5,280,476 | 1/1994 | Kojima et al. ........................... | 370/60.1 |
| 5,311,509 | 5/1994 | Heddes et al. ............................ | 370/60 |
| 5,379,297 | 1/1995 | Glover et al. ............................. | 370/60.1 |
| 5,381,411 | 1/1995 | Ohno et al. ............................... | 370/60 |
| 5,414,707 | 5/1995 | Johnston et al. ......................... | 370/79 |
| 5,420,858 | 5/1995 | Marshall et al. ......................... | 370/60.1 |
| 5,430,721 | 7/1995 | Dumas et al. ............................ | 370/60.1 |
| 5,455,826 | 10/1995 | Ozveren et al. ........................... | 370/60 |
| 5,490,141 | 2/1996 | Lai et al. .................................. | 370/60.1 |
| 5,535,197 | 7/1996 | Cotton ...................................... | 370/60 |
| 5,548,587 | 8/1996 | Bailey et al. ............................. | 370/60.1 |
| 5,557,607 | 9/1996 | Holden .................................... | 370/58.2 |
| 5,568,486 | 10/1996 | Huscroft et al. ......................... | 370/94.2 |
| 5,572,522 | 11/1996 | Calamvokis et al. .................... | 370/60.1 |
| 5,583,861 | 12/1996 | Holden .................................... | 370/395 |
| 5,592,476 | 1/1997 | Calamvokis et al. .................... | 370/390 |
| 5,600,650 | 2/1997 | Oskouy .................................... | 370/468 |
| 5,602,853 | 2/1997 | Ben-Michael et al. .................. | 370/474 |
| 5,617,416 | 4/1997 | Damien .................................... | 370/391 |
| 5,625,625 | 4/1997 | Oskouy et al. ........................... | 370/395 |
| 5,629,937 | 5/1997 | Hayter et al. ............................. | 370/233 |
| 5,701,292 | 12/1997 | Chiussi et al. ........................... | 370/232 |
| 5,726,985 | 3/1998 | Daniel et al. ............................. | 370/382 |
| 5,742,765 | 4/1998 | Wong et al. ............................. | 395/200.6 |
| 5,745,477 | 4/1998 | Zeng et al. ............................... | 370/230 |
| 5,751,709 | 5/1998 | Rathnavelu .............................. | 370/395 |
| 5,852,655 | 12/1998 | McHale et al. .......................... | 379/93.14 |

FOREIGN PATENT DOCUMENTS

| | | | |
|---|---|---|---|
| 0 130 260A1 | 9/1985 | European Pat. Off. .......... | H04L 5/14 |
| 0 325 794A2 | 2/1989 | European Pat. Off. ....... | H04Q 11/04 |

OTHER PUBLICATIONS

ADSL Forum TR–002, Technical Report, "ATM over ADSL Recommendations," Mar. 1997.
ADSL Forum WT–004 v. 3.0, Framing and Encapsulations Standards for ADSL: Packet Mode, Mar. 1977.

*Primary Examiner*—Chau Nguyen
*Assistant Examiner*—Kim T. Nguyen
*Attorney, Agent, or Firm*—Baker & Botts, L.L.P.

[57] ABSTRACT

A multiple mode xDSL interface (60) is disclosed. The multiple mode xDSL interface (60) includes an xDSL termination unit (62) operable to couple to an XDSL link (64) and to manage communication of data across an xDSL physical layer. The mulitple mode xDSL interface (60) also includes a customer premises equipment (CPE) termination unit (65) coupled to the xDSL termination unit (62) and operable to couple to customer premises equipment. The CPE termination unit (65) has an operating mode selected from a plurality of operating modes where each operating mode is associated with a data protocol and supports communication of data across the xDSL physical layer using the associated data protocol.

26 Claims, 2 Drawing Sheets

MULTIPLE MODE XDSL INTERFACE

TECHNICAL FIELD OF THE INVENTION

This invention relates in general to digital subscriber line communications, and more particularly to a multiple mode digital subscriber line (xDSL) interface.

BACKGROUND OF THE INVENTION

Digital subscriber line (DSL) technology provides a physical layer protocol for communicating information across a twisted pair telephone line at data rates exceeding those achievable using other physical layer protocols. One form of DSL is asymmetric digital subscriber line (ADSL) communication. ADSL communication involves transmitting data in one direction (typically towards the customer premises) at a greater data rate than data is transmitted in the other direction (typically towards the local exchange). There are also other forms of DSL such as symmetric DSL (SDSL), high-speed DSL (HDSL) and very high-speed DSL (VDSL). These various forms of DSL can be referred to generally as xDSL.

xDSL communication systems are generally implemented using a digital subscriber loop access multiplexer (DSLAM) located at a central office or other local exchange termination point of the public switched telephone network (PSTN). A DSLAM typically contains a number of xDSL termination units, or modems, that can establish an xDSL link and communicate xDSL protocol data across twisted pair telephone lines. The xDSL termination units can be connected to the telephone lines via splitter devices that separate the xDSL data traffic from voice traffic on the telephone lines. A splitter is similarly used at the customer premises to separate voice and xDSL data traffic and to provide the xDSL data traffic to an xDSL termination unit located at the remote customer premises. Once established, the xDSL link allows high speed data communication between the local exchange and the customer premises.

In general, the term "customer premises equipment" (CPE) can be used to encompass the equipment located at a remote customer site in the communication system. The CPE typically includes an xDSL interface component that has an xDSL termination unit for terminating the xDSL link as well as an interface component between the xDSL termination unit and other CPE components. The xDSL interface can comprise, for example, a network interface card (NIC) that interfaces between the xDSL link and a bus on a personal computer, workstation or other computing device. The xDSL interface can also form a component of a network router or bridge, such as an Ethernet router or bridge.

There is some disagreement as to what type of data traffic should be carried on the xDSL physical layer. For example, the ADSL Forum has published two technical reports suggesting competing modes for communicating data traffic across the ADSL physical layer. One mode is an asynchronous transfer mode (ATM) in which data traffic is carried by ATM cells. The other mode is a packet mode in which data is carried using high-level data link control (HDLC) or similar framed data packets. In particular, the framed packets can include point-to-point protocol (PPP) in HDLC-like frames and frame user network interface (FUNI) frames. Because of the competing ATM and packet modes of operation for data traffic over the ADSL link, it is possible that DSLAMs implemented in different regions will use different modes. Consequently, ADSL interfaces designed to be compatible with the ATM mode of operation would not work in a packet mode region, and vice versa. Further, one of the two modes is likely to become dominant, but it is unclear which that will be.

SUMMARY OF THE INVENTION

In accordance with the present invention, a multiple mode xDSL interface is provided that provides advantages over prior xDSL interfaces.

In accordance with one aspect of the present invention, a multiple mode xDSL interface is disclosed. The multiple mode xDSL interface includes an xDSL termination unit operable to couple to an xDSL link and to manage communication of data across an xDSL physical layer. The multiple mode xDSL interface also includes a customer premises equipment (CPE) termination unit coupled to the xDSL termination unit and operable to couple to customer premises equipment. The CPE termination unit has an operating mode selected from a plurality of operating modes where each operating mode is associated with a data protocol and supports communication of data across the xDSL physical layer using the associated data protocol.

In accordance with another aspect of the present invention, a method is disclosed for providing a multiple mode interface to an xDSL link. Communication of data across an xDSL physical layer of the xDSL link is managed. A plurality of operating modes are provided where each is associated with a data protocol and supports communication of data across the xDSL physical layer using the associated data protocol. A selection is made between the plurality of operating modes, and data is communicated with customer premises equipment. Thus, multiple data protocols for communicating across the xDSL physical layer are supported.

A technical advantage of the present invention is the provision of an xDSL interface that supports multiple data protocols. For example, the xDSL interface can support both an ATM mode and a packet mode of operation. In this manner, the xDSL interface allows compatibility with competing protocols for data traffic across the xDSL link. The selection between modes for the xDSL interface can be made in hardware or software and can be a manual or automatic process. The multiple mode xDSL interface of the present invention allows customer premises equipment to be built and installed that will support the type of DSLAM that is implemented in a particular region.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein.

DETAILED DESCRIPTION OF THE INVENTION

Figure 1:
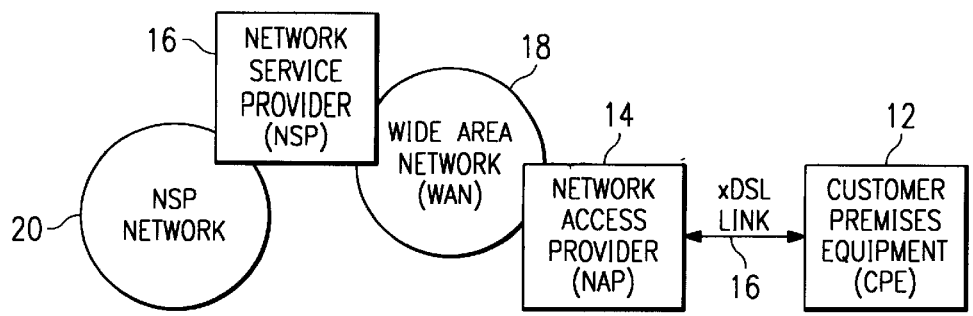
FIG. 1 is a block diagram of one embodiment of an xDSL link interconnecting a remote customer premises and a network access provider.

FIG. 1 is a block diagram of one embodiment of an xDSL link interconnecting a remote customer premises and a network access provider. As shown, customer premises equipment (CPE) 12 located at the remote site is connected to a network access provider (NAP) 14 via xDSL link 16. Network access provider 14 is in communication with a network service provider (NSP) 16 via a wide area network (WAN) 18. Further, network service provider 16 provides access to an NSP network 20, as shown. xDSL link 16 can be an ADSL, SDSL, HDSL, VDSL or other DSL link, and, as used herein, xDSL refers generally to these forms of DSL.

Network access provider 14 represents an entity that terminates xDSL link 16 at a central office or other local exchange termination point. Network service provider 16 represents an entity that provides access to higher level network services. For example, network service provider 16 can comprise an Internet service provider (ISP) or a corporate office providing network services to a remote office or telecommuter. It should be understood that network access provider 14 and network service provider 16 can comprise the same physical organization but need not do so. For example, a regional Bell operating company (RBOC) could provide both xDSL service and Internet access in which case it would maintain the role of both network access provider 14 and network service provider 16.

Customer premises equipment 12 can comprise a personal computer, computer workstation or other computing device with an xDSL interface. Alternatively, customer premises equipment 12 can comprise a network router or bridge, such as an Ethernet router or bridge, that includes an xDSL interface and provides connectivity to a customer premises network.

Figure 2:
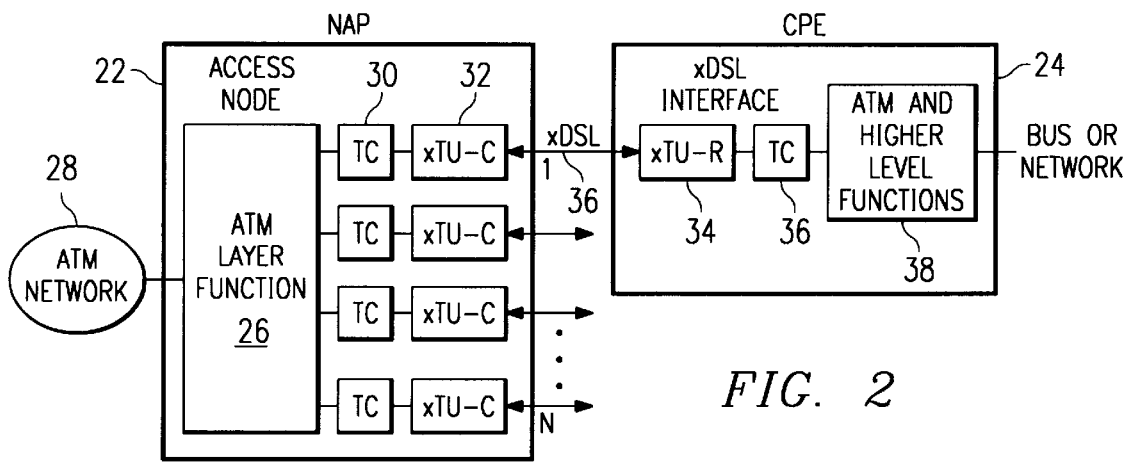
FIG. 2 is a block diagram of one embodiment of an xDSL communication system using an ATM mode for data traffic across an ADSL link.

FIG. 2 is a block diagram of one embodiment of an xDSL communication system using an ATM mode for data traffic across an xDSL link. As shown, a network access provider operates an access node 22 which is connected to an xDSL interface 24 component of the customer premises equipment. Access node 22 includes an ATM layer function block 26 that is coupled to an ATM network 28. Access node 22 further includes a plurality of transmission convergence (TC) units 30. Each TC unit 30 is connected to an xDSL termination unit (xTU) 32. xDSL termination units 32 in access node 22 are designated as "xTU-C" because they are associated with the central office or other local exchange termination point.

The customer premises equipment includes xDSL interface 24 which comprises an xDSL termination unit (xTU) 34. xDSL termination unit 34 is designated as "xTU-R" because it is associated with a remote site. xDSL termination unit 34 is in communication with one of the xDSL termination units 32 across an xDSL link 36, as shown. At a given point in time, any number of xDSL termination units 32 from access node 22 can be in communication with remote xDSL interface units 34 to support communication to customer premises. xDSL interface 24 further includes a transmission convergence (TC) unit 36 and a block 38 that provides ATM and higher level functions. Block 38 provides an interface to other components of the customer premises equipment. Block 38 can interface, for example, to a bus on a personal computer, workstation or other computing device. Block 38 can also interface to a user network, such as an Ethernet local area network.

In operation, access node 22 performs adaptation between the public network and ATM network 28. In the downstream direction (i.e., towards the customer premises), access node 22 may perform routing and demultiplexing. In the upstream direction (i.e., towards the ATM network), access node 22 may perform multiplexing and concentration. In operation, xDSL interface 24 performs termination of the xDSL physical layer and ATM layer. ATM layer function block 26 and block 38 perform the upstream and downstream routing of cell traffic, for example, on a virtual path identifier and/or a virtual channel identifier basis. TC units 30 and TC unit 36 manage the transmission convergence physical sublayer for the ATM traffic. ADSL termination units 32 and ADSL termination unit 34 provide physical layer handling for the xDSL traffic at the network and customer premises end. An ADSL communication system similar to the system shown in FIG. 2, as well as the various functional blocks, is disclosed and described in "Technical Report, TR-002, ATM over ADSL Recommendations," Mar. 20, 1997, the disclosure of which is incorporated herein by reference.

Figure 3:
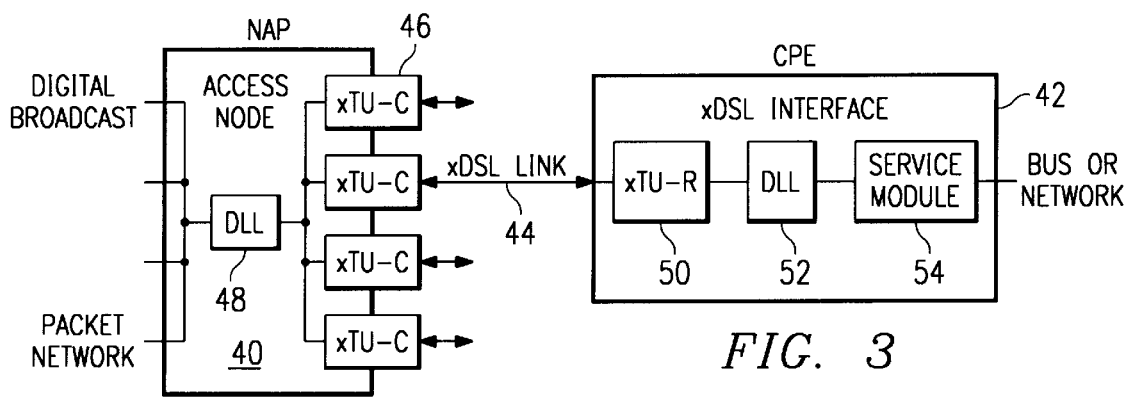
FIG. 3 is a block diagram of one embodiment of an xDSL communication system using a packet mode for data traffic across an ADSL link.

FIG. 3 is a block diagram of one embodiment of an xDSL communication system using a packet mode for data traffic across an xDSL link. As shown, an access node 40 associated with a network access provider is connected across an xDSL link 44 to an xDSL interface 42 associated with a customer premises. Access node 40 includes a plurality of xDSL termination units (xTU-C) 46. Each xDSL termination unit 46 can be connected to a respective xDSL interface 42. Within access node 40, each xDSL termination unit 46 is connected to a digital link layer block 48. Digital link layer block 48 in turn can be connected to a digital broadcast or packet network, as shown. At the customer premises side, xDSL interface 42 includes an xDSL termination unit (xTU-R) 50. xDSL termination unit 50 is coupled to a digital link layer block 52 which is in turn coupled to a service module 54. Service module 54 provides an interface to a bus or network for communicating with other components of the customer premises equipment.

In operation, the system of FIG. 3 manages communication of framed data packets across xDSL link 44. The system can be implemented, for example, to support two operating modes: point-to-point protocol (PPP) in high-level data link control (HDLC) like frames (RFC1662 mode); and frame user network interface (FUNI) frames (i.e., FUNI mode). In this scheme, the xDSL physical layer provides a point-to-point physical layer bitstream upon which either of these two framed packet data formats can be carried in the data link layer. An ADSL communication system similar to the system shown in FIG. 3, as well as the various functional blocks, is disclosed and described in "Framing and Encapsulations Standards for ADSL: Packet Mode," WT-004, v. 3.0, March 1997, Technical Report of the ADSL Forum, the disclosure of which is incorporated herein by reference. One feature mentioned as a general attribute in this reference is that one implementation can allow switching between operation in the RFC1662 mode and FUNI mode for framed data packets. Further, the reference mentions an auto-detection scheme and algorithm for accomplishing this switching between framed packet operating modes.

In operation, access node 40 communicates packets with the connected digital broadcast packet network. Access node 40 can alternatively communicate with an ATM wide area network (WAN) backbone (not shown) using ATM interworking functions. Digital link layer block 48 processes packets and communicates information with appropriate xDSL termination units 46 for communication across an xDSL link 44. Digital link layer block 48 manages the data protocol layer while xDSL transmission unit 46 manages the xDSL physical layer. On the customer premises side, xDSL termination unit 50 manages the xDSL physical layer and communicates data to digital link layer block 52. Digital link layer block 52 manages communicating packets in the framing protocol layer. Digital link layer block 52 communicates information with service module 54 which provides an interface to other components of the customer premises equipment. This interface can be to a bus of a personal computer, workstation or other computing device. Service module 54 can also provide an interface to a local area network. The system of FIG. 3 thus allows framed packets to be communicated across the physical layer provided by xDSL link 44.

Figure 4:
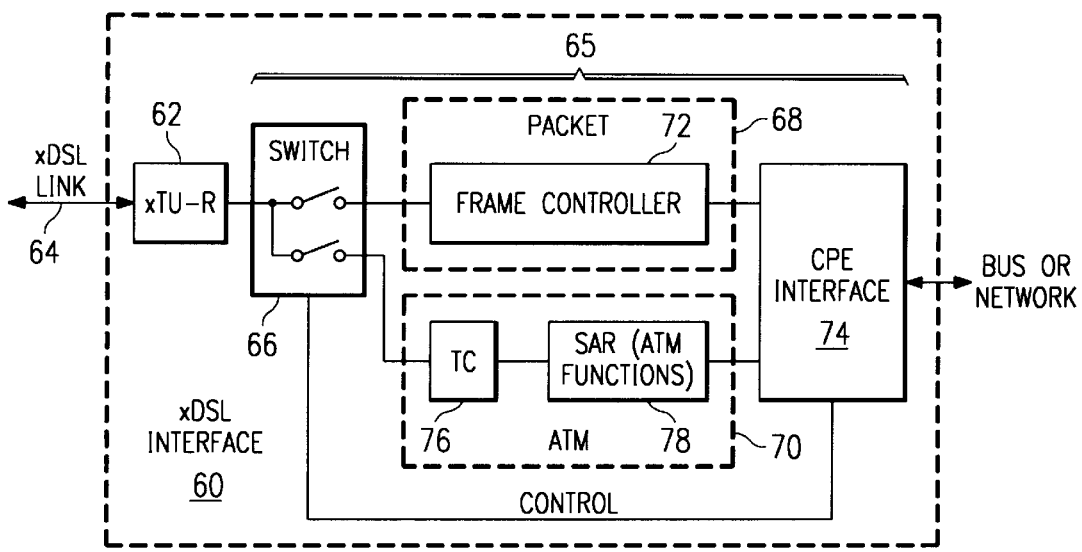
FIG. 4 is a block diagram of one embodiment of a multiple mode xDSL interface constructed according to the teachings of the present invention.

FIG. 4 is a block diagram of one embodiment of a multiple mode xDSL interface constructed according to the teachings of the present invention. In particular, the multiple mode xDSL interface is advantageous for use in an ADSL communication system due to the problem that is presented by the competing ATM mode and packet mode data protocol standards published by the ADSL Forum. Because different modes may be used for xDSL links installed in various regions, customer premises equipment designed to operate in ATM mode would not work in a region with packet mode digital subscriber line access multiplexers (DSLAMs). Conversely, customer premises equipment designed to operate in packet mode would not work with ATM mode DSLAMs.

According to the present invention, xDSL interface 60 of FIG. 4 provides dual modes of operation to be compatible with both ATM mode and packet mode data protocols. Further, although the embodiment of FIG. 4 is a dual mode xDSL interface, additional numbers of modes could be supported in accordance with the present invention.

As shown in FIG. 4, xDSL interface 60 includes an xDSL termination unit (xTU-R) 62 which is coupled to an xDSL link 64. xDSL termination unit 62 is also coupled to a CPE termination unit 65 that provides a multiple mode interface to a bus or network at the customer premises. According to the teachings of the present invention, CPE termination unit 65 has multiple modes of operation to handle different protocol layers established on xDSL link 64. In the illustrated embodiment, CPE termination unit 65 has two modes: ATM mode and packet mode. In this dual mode embodiment, CPE termination unit 65 includes a switch 66 that receives a control signal, CONTROL. In the embodiment of FIG. 4, switch 66 can connect xDSL termination unit 62 to one of two paths, as shown, based upon the control signal, CONTROL. The setting of switch 66 can be accomplished in hardware or software either manually or automatically. In this manner, switch 66 provides a dual path for data traffic communicated through xDSL interface 60 of FIG. 4. Of course, there are alternative ways to provide selectability for CPE termination unit 65 in addition to the use of switch 66.

In the illustrated embodiment, xDSL interface 60 provides a packet mode path 68 and an ATM mode path 70. Packet mode path 68 can comprise a frame controller 72. Frame controller 72 operates to manage framed packet communication, such as HDLC or similar framed packets, and such functionality is generally available in an integrated circuit chip. One example of frame controller 72 is the TXC-05101C available from TRANSWITCH CORPORATION. Frame controller 72 is coupled to a customer premises equipment (CPE) interface 74. CPE interface 74 can provide an interface to a bus of a personal computer, workstation or other computing device. Alternatively, CPE interface 74 can provide an interface to a customer premises network, such as an Ethernet local area network. CPE interface 74 operates to communicate data at higher protocol layers. CPE interface 74 of FIG. 4 can have selectable packet and ATM modes of operation or can comprise separate packet and ATM mode paths.

ATM path 70 can comprise a transmission convergence (TC) unit 76 coupled to a segmentation and reassembly (SAR) unit 78. SAR unit 78 is then coupled to CPE interface 74. In operation, SAR unit 78 provides ATM functions for ATM mode path 70. Both TC unit 76 and SAR unit 78 functions can be implemented using integrated circuit chips. One example of a TC component is the TXC-05150 available from TRANSWITCH CORPORATION. One example of an SAR component is the Bt8230 product available from BROOKTREE (now ROCKWELL).

According to the teachings of the present invention, xDSL interface 60 can be implemented in a network interface card (NIC), a network router or bridge, or other customer premises equipment. xDSL interface 60 can be implemented as a printed circuit board or boards containing a plurality of separate integrated circuit chip components to implement each of the various blocks. Alternatively, ADSL interface 60 can include integrated circuit chips that combine two or more of the disclosed blocks, such as an application specific integrated circuit (ASIC). For example, switch 66, frame controller 72, TC unit 76, SAR unit 78 and CPE interface 74 can be implemented as one integrated circuit chip. This chip can then be coupled to a commercially available chip set for xDSL transmission unit 62 available from various xDSL suppliers.

It should be understood that xDSL interface 60 can be installed, for example, on a PCI bus or other bus of a personal computer, workstation or computing device. Further, xDSL interface 60 can form a component of a router or bridge for connection to a customer premises network. Other uses for xDSL interface 60 are also possible and should be apparent to one of skill in the art.

For the embodiment of FIG. 4, the function of controlling CPE termination unit 65 through switch 66 and CPE interface 74 to select the appropriate path for data traffic can be implemented in a number of ways. xDSL interface 60 can have a hardware switch, such as a DIP switch, that allows a user to hard set the path when xDSL interface 60 is installed. This assumes that the user would know to which mode of xDSL link 64 he was connected. For example, the user could thus set switch 66 to use either packet mode path 68 or ATM mode path 70 upon installation.

Alternatively, switch 66 and CPE interface 74 can be controlled by software drivers used to install xDSL interface 60 and to set up the xDSL stack. The software drivers can be executed by the user when installing xDSL interface 60. One of the steps in the setup process can be to set whether the xDSL interface 60 will be used in packet mode or ATM mode. When the setting is selected, that information is communicated through CPE interface 74 to switch 66. Switch 66 is then set to a particular operating mode until changed by the user using the software driver.

A further alternative is to perform mode autodetection based upon data being communicated through xDSL interface 60. The auto-detect process can be performed by CPE interface 74 or software executing on other CPE components. In response to auto-detection of which mode is being used, CPE interface 74 or the software could set switch 66 in the proper mode. For example, switch 66 could be set to initially operate in one of the two modes. The auto-detect process could then determine whether or not data is being correctly communicated. If not, the process could switch to the other mode.

Figure 5:
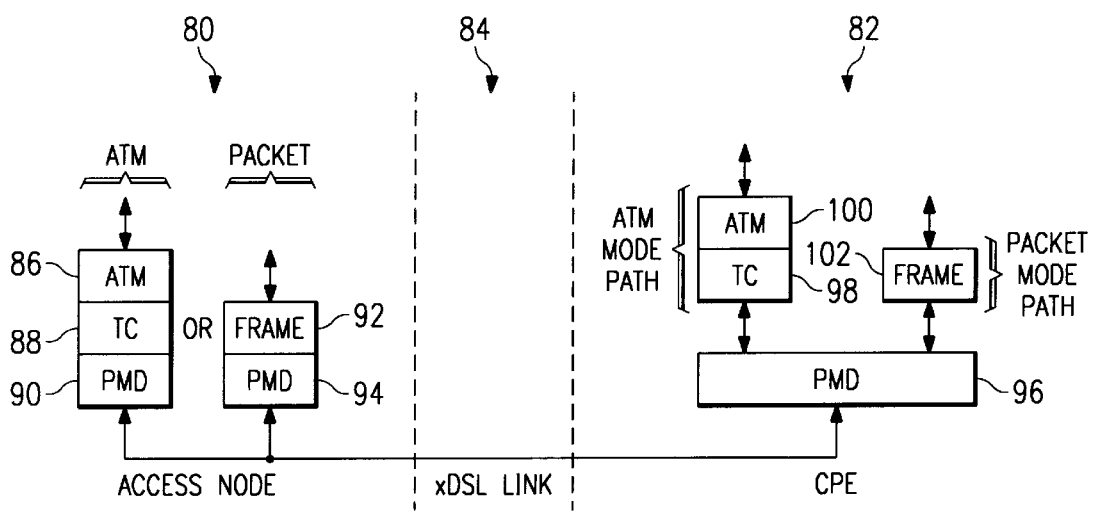
FIG. 5 is a protocol layer diagram relating to the xDSL interface of FIG. 4.

FIG. 5 is a protocol layer diagram relating to xDSL interface 60 of FIG. 4. As shown, the xDSL communication environment includes an access node, indicated generally at 80, and customer premises equipment, indicated generally at 82, interconnected by an xDSL link, indicated generally at 84. The protocol layers in access node 80 depend upon whether access node 80 uses an ATM mode or packet mode. In ATM mode, the protocol layers comprise ATM layer 86, transmission convergence (TC) layer 88 and physical media dependent (PMD) layer 90. It should be understood that additional layers exist above ATM layer 86. However, those layers are not discussed herein. In packet mode, the protocol layers include frame layer 92 and PMD layer 94. The access node 80 installed in a particular region, for example, may use either ATM mode or packet mode. However, it would also be possible for an access node 80 to implement both ATM and packet modes and allow switching between the two modes.

On the customer premises side, the dual mode xDSL interface of FIG. 4 supports the illustrated protocol layers. A PMD layer 96 is supported by the xDSL termination unit whether the xDSL interface is in ATM mode or packet mode. However, the layers above PMD layer 96 are dependent upon the operating mode of the xDSL interface. If the xDSL interface is in ATM mode, then a transmission convergence (TC) layer 98 and an ATM layer 100 are supported by the xDSL interface. Alternatively, when in packet mode, the xDSL interface supports frame layer 102 for handling the framed packet communication. It should be understood that additional layers exist above ATM layer 100 and frame layer 102, but are not discussed herein. Communication between access node 80 and CPE 82 is thus accomplished across the illustrated physical and lower level data protocol layers.

According to the present invention, the xDSL interface component of CPE 82 supports multiple protocol stacks to allow a single xDSL interface to be compatible with multiple data protocols. This multiple mode operation provides significant advantages over conventional xDSL interface equipment.

Although the present invention has been described in detail, it should be understood that various changes, substitutions and alterations can be made hereto without departing from the spirit and scope of the invention as defined by the appended claims.

What is claimed is:

1. A multiple mode digital subscriber line (xDSL) interface, comprising:
  an xDSL termination unit operable to couple to an xDSL link and to manage communication of data across an xDSL physical layer; and
  a customer premises equipment (CPE) termination unit comprising:
    a packet communication path operable to manage communication of framed data packets of a data link protocol layer;
    an asynchronous transfer mode (ATM) communication path operable to manage a transmission convergence (TC) physical sublayer and communication of cells of an ATM protocol layer;
    a switch coupled to the xDSL termination unit, to the packet communication path, and to the ATM communication path, the switch operable to connect the xDSL termination unit to the packet communication path or to the ATM communication path; and
    a customer premises equipment (CPE) interface coupled to the packet communication path and to the ATM communication path and operable to couple to customer premises equipment, the CPE interface operable to communicate data at higher protocol layers;

such that the multiple mode xDSL interface provides a packet operating mode and an ATM operating mode for interconnecting to the xDSL link, each operating mode associated with a data protocol and supporting communication of data across the xDSL physical layer using the associated data protocol.

2. The multiple mode xDSL interface of claim 1, wherein the form of xDSL is asymmetric DSL (ADSL).

3. The multiple mode xDSL interface of claim 1, wherein the CPE interface has selectable packet and ATM operating modes.

4. The multiple mode xDSL interface of claim 1, wherein the CPE interface comprises separate packet mode and ATM mode paths.

5. The multiple mode xDSL interface of claim 1, wherein the connection of the switch and the mode of operation of the CPE interface are set in hardware.

6. The multiple mode xDSL interface of claim 1, wherein the mode of operation of the CPE interface is set by software executed on customer premises equipment, and wherein the connection of the switch is set by a control signal from the CPE interface.

7. The multiple mode xDSL interface of claim 1, wherein the packet communication path comprises a frame controller coupled to the switch and to the CPE interface.

8. The multiple mode xDSL interface of claim 1, wherein the ATM communication path comprises:
  a transmission convergence (TC) unit coupled to the switch; and
  a segmentation and reassembly (SAR) unit coupled to the TC unit and to the CPE interface.

9. The multiple mode xDSL interface of claim 1, wherein the framed data packets are high level data link control (HDLC) like framed data packets.

10. The multiple mode xDSL interface of claim 9, wherein the framed data packets comprise point-to-point protocol (PPP) HDLC frames.

11. The multiple mode xDSL interface of claim 9, wherein the HDLC framed data packets comprise frame user network interface (FUNI) frames.

12. The multiple mode xDSL interface of claim 1, wherein the CPE interface is operable to couple to a bus of a computing device.

13. The multiple mode xDSL interface of claim 1, wherein the CPE interface is operable to couple to a network device.

14. The multiple mode xDSL interface of claim 1, wherein the CPE termination unit is implemented as a single integrated circuit device.

15. The multiple mode xDSL interface of claim 1, wherein the xDSL termination unit, switch, packet communication path, ATM communication path, and CPE interface are implemented using separate integrated circuit devices.

16. The multiple mode xDSL interface of claim 1, wherein the switch, packet communication path, ATM communication path, and CPE interface are implemented as a single integrated circuit device.

17. A method for providing a multiple mode interface to a digital subscriber line (xDSL) link, comprising:
  managing communication of data across an xDSL physical layer of the xDSL link;
  providing a physical packet communication path for managing communication of framed data packets of a data link protocol layer and a physical asynchronous transfer mode (ATM) communication path for managing a transmission convergence (TC) physical sublayer and communication of cells of an ATM protocol layer in a customer premises equipment (CPE) termination unit, such that multiple operating modes are supported, each operating mode supporting communication of data across the xDSL physical layer using the associated data protocol;

selecting between the packet communication path and the ATM communication path using a switch thereby changing the operating modes; and communicating data with customer premises equipment.

18. The method of claim 17, wherein selecting an operating mode comprises selecting between the packet communication path and the ATM communication path.

19. The method of claim 17, wherein the form of xDSL is ADSL.

20. The method of claim 17, wherein selecting between operating modes is accomplished by a hardware setting.

21. The method of claim 17, wherein selecting between operating modes is accomplished by software executed on customer premises equipment.

22. The method of claim 17, wherein the packet communication path is implemented using a frame controller.

23. The method of claim 17, wherein the ATM communication path is implemented using a transmission convergence (TC) unit and a segmentation and reassembly (SAR) unit.

24. The method of claim 18, wherein the managing, providing, selecting and communicating are implemented using separate integrated circuit devices.

25. The method of claim 18, wherein the providing, selecting and communicating are implemented using a single integrated circuit device.

26. The method of claim 17, wherein the framed data packets are high level data link control (HDLC) like framed data packets.

* * * * *